United States Patent
Harvey

(10) Patent No.: US 12,553,632 B2
(45) Date of Patent: Feb. 17, 2026

(54) SYSTEMS AND METHODS FOR PREVENTION OF WATER DAMAGE FROM HVAC OPERATION

(71) Applicant: STATE FARM MUTUAL AUTOMOBILE INSURANCE COMPANY, Bloomington, IL (US)

(72) Inventor: Brian N. Harvey, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 385 days.

(21) Appl. No.: 18/115,872

(22) Filed: Mar. 1, 2023

(65) Prior Publication Data

US 2024/0271811 A1 Aug. 15, 2024

Related U.S. Application Data

(60) Provisional application No. 63/445,808, filed on Feb. 15, 2023.

(51) Int. Cl.
*F24F 11/38* (2018.01)
*F24F 11/50* (2018.01)
*F24F 11/74* (2018.01)
*F24F 130/10* (2018.01)

(52) U.S. Cl.
CPC .............. *F24F 11/38* (2018.01); *F24F 11/50* (2018.01); *F24F 11/74* (2018.01); *F24F 2130/10* (2018.01)

(58) Field of Classification Search
CPC ......... F24F 11/50; F24F 11/74; F24F 2130/10
See application file for complete search history.

(56) References Cited

U.S. PATENT DOCUMENTS

| | | | | |
|---|---|---|---|---|
| 10,685,402 B1 * | 6/2020 | Bryant | .................... | G16Y 10/50 |
| 11,003,334 B1 * | 5/2021 | Conway | .................. | G06Q 40/08 |
| 12,379,116 B1 * | 8/2025 | Romero, Jr. | .............. | F24F 7/08 |
| 2005/0048427 A1 * | 3/2005 | Brown | .................. | F23L 17/005 |
| | | | | 126/116 A |
| 2006/0174707 A1 * | 8/2006 | Zhang | ................ | G01N 29/4418 |
| | | | | 700/282 |
| 2016/0355090 A1 * | 12/2016 | Murata | ...................... | F01N 9/00 |
| 2017/0362801 A1 * | 12/2017 | Van Goor | ................. | F17D 1/05 |
| 2020/0194812 A1 * | 6/2020 | Jeon | ................... | H01M 8/04253 |
| 2021/0018222 A1 * | 1/2021 | Boros | ..................... | F24H 15/20 |
| 2021/0072097 A1 * | 3/2021 | Trundle | ................... | F24F 11/62 |
| 2024/0181959 A1 * | 6/2024 | Weston | .............. | G07C 9/00309 |

\* cited by examiner

*Primary Examiner* — Santosh R Poudel
(74) *Attorney, Agent, or Firm* — MARSHALL, GERSTEIN & BORUN LLP

(57) ABSTRACT

Systems and methods are described for detecting and responding to a likelihood of a heating system malfunction. The method may include: (1) receiving home telematics data associated with a structure, wherein the home telematics data includes local weather data for an area associated with the structure; (2) receiving operation data regarding a functionality of a heating system associated with the structure; (3) diagnosing, based upon at least the home telematics data and the operation data, a potential malfunction in the heating system; (4) determining, based upon at least the diagnosis, that a threshold likelihood of bursting is exceeded for one or more pipes; and (5) transmitting an indication to a user associated with the structure that the one or more pipes are likely to burst.

20 Claims, 6 Drawing Sheets

SYSTEMS AND METHODS FOR PREVENTION OF WATER DAMAGE FROM HVAC OPERATION

FIELD OF THE DISCLOSURE

Systems and methods are disclosed for using home telematics data and determining a potential for malfunctions in a heating system and/or damage to pipes based upon at least the home telematics data.

BACKGROUND

Cold weather may cause a number of problems in the structure, safety, and general well-being of a house or other building, including the potential of water damage from burst pipes due to freezing. Heating systems, such as a heating, ventilation, and air conditioning (HVAC) system, may help to mitigate such problems but may themselves malfunction, leading to additional damage as the heating system may be unable to counteract the cold. If an exhaust pipe is obstructed, for example, the heating system may automatically shut down due to the inability to properly vent heating byproducts such as carbon monoxide, causing pipes carrying water throughout the property to freeze and burst in cold weather. As such, even properties with vigilant property owners may be damaged by the cold. This may be especially true where the property may not always be occupied, such as a vacation home or secondary property.

Conventional techniques may include additional ineffectiveness, inefficiencies, encumbrances, and/or other drawbacks.

SUMMARY

The present embodiments may relate to, inter alia, accurately and efficiently determining when a pipe or piping system has burst and/or sprung a leak. Systems and methods that may detect or determine when a pipe or piping system is likely to burst and/or spring a leak are also provided.

In one aspect, a computer-implemented method for detecting and responding to a likelihood of a heating system malfunction may be provided. The method may be implemented via one or more local or remote processors, servers, sensors, transceivers, memory units, mobile devices, wearables, smart glasses, augmented reality glasses, virtual reality glasses, smart contacts, mixed or extended reality glasses or headsets, voice or chat bots, ChatGPT bots, and/or other electronic or electrical components, which may be in wired or wireless communication with one another. In one instance, the method may include (1) receiving, by one or more processors, home telematics data associated with a structure, wherein the home telematics data includes local weather data for an area associated with the structure; (2) receiving, by the one or more processors, operation data regarding a functionality of a heating system associated with the structure; (3) diagnosing, by the one or more processors and based upon at least the home telematics data and the operation data, a potential malfunction in the heating system; (4) determining, by the one or more processors and based upon at least the diagnosis, that a threshold likelihood of bursting is exceeded for one or more pipes; and/or (5) transmitting, by the one or more processors, an indication to a user associated with the structure that the one or more pipes are likely to burst. The method may include additional, less, or alternate functionality, including that discussed elsewhere herein.

For instance, diagnosing the potential malfunction may include determining that an obstacle is blocking one or more exhaust pipes for the heating system; and/or determining that the heating system has or will shut down due to the obstacle blocking the one or more exhaust pipes. The method may further include, responsive to determining that the heating system has or will shut down, causing, by the one or more processors, one or more apparatuses associated with the one or more exhaust pipes to expel air to remove the obstacle.

The method may further include, responsive to determining that the heating system has or will shut down, causing, by the one or more processors, one or more smart devices associated with the one or more exhaust pipes to move perpendicular to exits of the one or more exhaust pipes to remove the obstacle.

Further, diagnosing the potential malfunction may include determining, based upon at least the home telematics data, that a future weather event will cause a future blockage for one or more exhaust pipes for the heating system; and/or determining that a threshold likelihood of the heating system shutting down due to the blockage is exceeded.

The method may further include training, by the one or more processors and using historical telematics data, a machine learning model to determine whether a weather event will cause a blockage for the one or more exhaust pipes. Diagnosing the potential malfunction may be performed using the machine learning model.

The method may further include, responsive to determining that threshold likelihood of the heating system shutting down due to the blockage is exceeded, preemptively causing, by the one or more processors, one or more apparatuses associated with the one or more exhaust pipes to expel air to prevent blockage.

The method may further include causing, by the one or more processors, a water flow through the one or more pipes to stop responsive to determining that the threshold likelihood of bursting is exceeded for the one or more pipes. Further, the operation data may include at least one of: (i) air flow sensor data; (ii) internal temperature data; (iii) moisture data; or (iv) accelerometer data.

Further, diagnosing the potential malfunction may include determining, based upon at least the operation data and using a machine learning model, that one or more components of the heating system are not activated; and/or determining, based upon at least determining that the one or more components of the heating system are not activated, that the heating system is malfunctioning.

In another aspect, a computing device configured for detecting and responding to a likelihood of a heating system malfunction may be provided. The computing device may include one or more processors; a communication unit; one or more sensors associated with a heating system associated with a structure; and a non-transitory computer-readable medium coupled to the one or more processors and the communication unit and storing instructions thereon that, when executed by the one or more processors, cause the computing device to: (1) receive home telematics data associated with the structure, wherein the home telematics data includes local weather data for an area associated with the structure; (2) receive, from the one or more sensors, operation data regarding a functionality of the heating system; (3) diagnose, based upon at least the home telematics data and the operation data, a potential malfunction in the heating system; (4) determine, based upon at least the diagnosis, that a threshold likelihood of bursting is exceeded for one or more pipes; and/or (5) transmit an indication to a user associated with the structure that the one or more pipes are likely to burst. The computing device may include additional, less, or alternate functionality, including that discussed elsewhere herein.

In another aspect, a tangible, non-transitory computer-readable medium storing instructions for detecting and responding to a likelihood of a heating system malfunction may be provided. The non-transitory computer-readable medium may store instructions that, when executed by one or more processors of a computing device, cause the computing device to: (1) receive home telematics data associated with a structure, wherein the home telematics data includes local weather data for an area associated with the structure; (2) receive operation data regarding a functionality of a heating system associated with the structure; (3) diagnose, based upon at least the home telematics data and the operation data, a potential malfunction in the heating system; (4) determine, based upon at least the diagnosis, that a threshold likelihood of bursting is exceeded for one or more pipes; and/or (5) transmit an indication to a user associated with the structure that the one or more pipes are likely to burst. The computer-readable instructions may include instructions that provide additional, less, or alternate functionality, including that discussed elsewhere herein.

This summary is provided to introduce a selection of concepts in a simplified form that are further described below. This summary is not intended to identify key features or essential features of the claimed subject matter, nor is it intended to be used to limit the scope of the claimed subject matter.

Advantages will become more apparent to those of ordinary skill in the art from the following description of the preferred aspects, which have been shown and described by way of illustration. As will be realized, the present aspects may be capable of other and different aspects, and their details are capable of modification in various respects. Accordingly, the drawings and description are to be regarded as illustrative in nature and not as restrictive.

Figure 1:
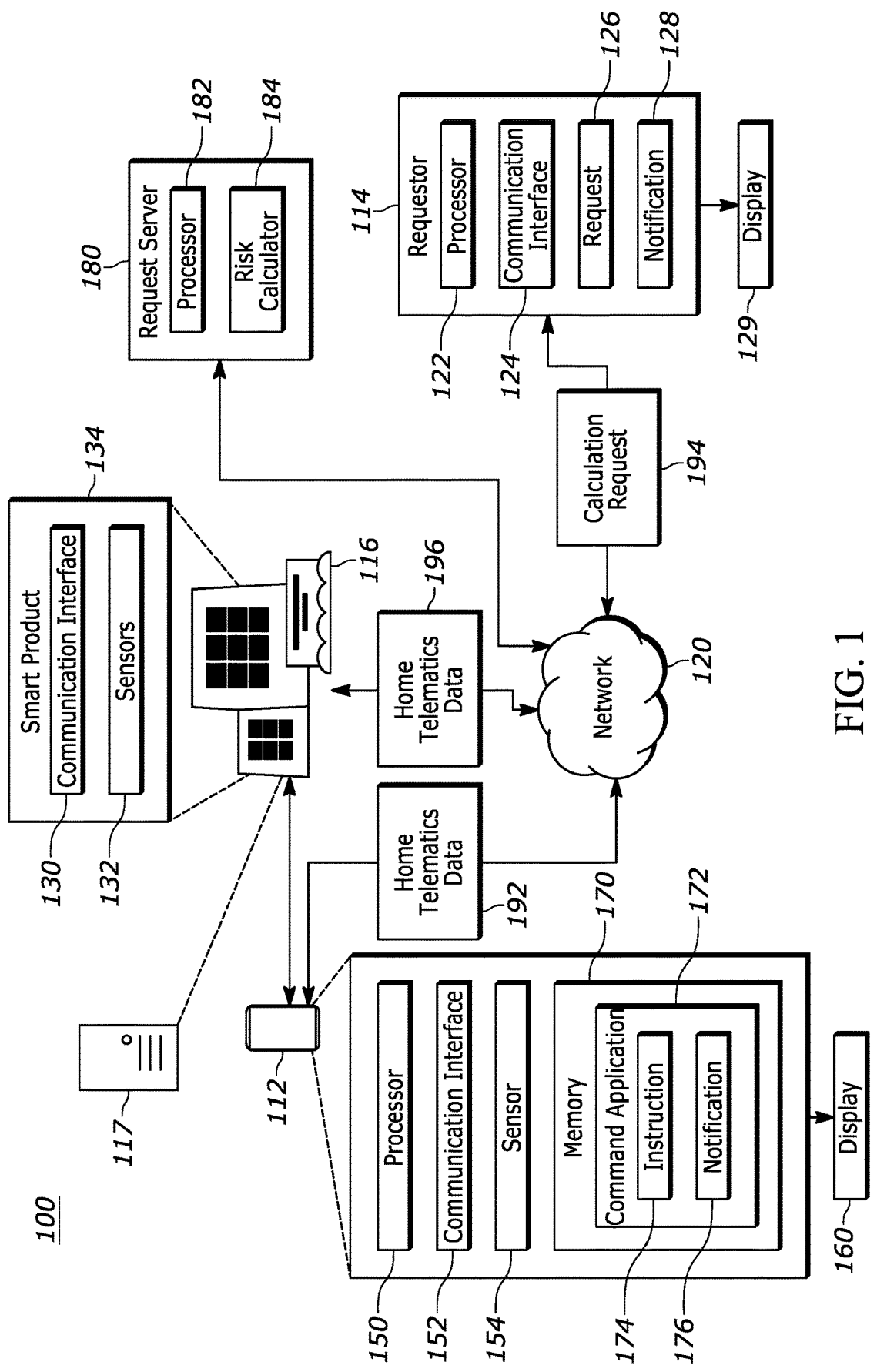
FIG. 1 depicts an exemplary computer system that facilitates generating and recording home telematics data for calculating a level of risk of heating system malfunction and/or pipe bursting.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Techniques, systems, apparatuses, components, devices, and methods are disclosed for, inter alia, detecting a malfunction to a heating system (such as an HVAC system) and subsequent damage to pipes (and/or piping systems) based upon home telematics data and operation data. For example, a system may receive home telematics data regarding a home, building, environment, etc. Similarly, as part of the home telematics data, the system may receive weather data for a property, occupancy data for the property, historical damage data, etc. The system may additionally receive operation data regarding the operation of the heating system and/or pipes as described herein.

In some scenarios, a system as described herein can receive home telematics data regarding weather or temperature for a surrounding area of a structure and/or more generalized weather information for a broader area. The system may additionally receive data regarding the operation of a heating system, including indications of whether the system is currently operating, a time of last operation, a frequency of operation, areas of operation, historical operation data, etc. Based upon the home telematics data and the operation data, the system may determine that a potential malfunction in the heating system has occurred or will occur. The system may additionally determine that the heating system malfunction has caused or will cause one or more pipes to burst, leak, or otherwise become damaged and notify a user, such as through a mobile application, text message, audio alert, and/or any other such technique as described herein.

In further scenarios, a system as described herein can cause one or more devices associated with the heating system to respond to the diagnosis of a potential heating system malfunction, determination of potential pipe damage, and/or a prompt from a user. In particular, the system may cause an apparatus associated with the heating system (e.g., attached to or near an exhaust pipe of the heating system) to blow pressurized and/or heated air to clear potential obstructions and prevent or alleviate malfunctions in the heating system.

In still further scenarios, a system as described herein can cause one or more smart devices separate from the heating system to respond to the diagnosis of a potential heating system malfunction, determination of potential pipe damage, and/or a prompt from a user. In particular, the system may cause a smart device (e.g., an autonomous smart device, remote-operated smart device, etc.) to move around and/or adjacent to a portion of the heating system (e.g., such as an exhaust pipe for the heating system) to clean, clear, and/or otherwise remove an obstruction to prevent or alleviate malfunctions in the heating system.

As such, a system implementing the techniques as described herein offers improvements over standard computing systems. For example, by using algorithms/models trained via machine learning to determine when a heating system is malfunctioning, when a pipe frozen, when a heating system is predicted to malfunction, when a pipe is predicted to burst, etc., the system may be able to automatically warn a user, preventing damage to a user's property. Further, by training such models using sensor data from sensors such as those described herein, weather and/or forecast data, or occupancy data as described herein, the system is able to improve the operation of the system and better prevent damage to the property as a whole.

Moreover, by interfacing with smart devices, applications, and/or internal property systems (e.g., the heating system), the system may be able to take action in response to determining when such irregularities occur. For example, a system may be able to remove a potential obstruction before damage to the property can occur. Further, other improvements are offered by the instant techniques as described in more detail below.

Exemplary Computer System for Detecting, Predicting, and/or Responding to Malfunctions in a Heating System FIG. 1 depicts an exemplary computer system 100 for detecting, predicting, and/or responding to heating system malfunctions and/or damage to pipes in a home (or other building), in accordance with various aspects of the present disclosure. An entity (e.g., requestor 114), such as a user or an insurance company, may wish to calculate a level of risk for a user regarding a real property (e.g., property 116).

Additionally, the property (e.g., property 116) and, more specifically, a computing device 117 associated with the property 116, a smart device 110 within the property 116, and/or one or more mobile devices may detect, gather, or store home data (e.g., home telematics data) associated with the functioning, operation, and/or evaluation of the property 116. The computing device 117 associated with the property 116 may transmit home telematics data in a communication 196 via the network 130 to a request server 180. In some embodiments, the request server 180 may already store home data (e.g., home telematics data) and/or user data (e.g., user telematics data) in addition to any received home telematics data or user telematics data. Further, the request server 180 may use the home telematics data and/or user telematics data to determine characteristics of a property (e.g., temperature, weather, occupancy, etc.) and/or structures on a property (e.g., pipes, smart devices, water systems, heating systems, etc.). Additionally or alternatively, one or more mobile devices (e.g., mobile device 112) communicatively coupled to the computing device associated with the property 116 may transmit home telematics data and/or user telematics data in communication 192 to the request server 180 via the network 130.

The smart device 110 may include a processor, a set of one or several sensors 120, and/or a communications interface 118. In some embodiments, the smart device 110 may include single devices, such as a smart heater, smart thermostat, smart doorbell, or any other similar smart device. In further embodiments, the smart device 110 may include a network of devices, such as a security system, a lighting system, a heating system, a plumbing system or any other similar series of devices communicating with one another. The set of sensors 120 may include, for example, a camera or series of cameras, a motion detector, a temperature sensor, an airflow sensor, a smoke detector, a carbon monoxide detector, a pressure sensor, a moisture sensor, or any similar sensor.

Although FIG. 1 depicts the set of sensors 120 inside the smart device 110, it is noted that the sensors 120 need not be internal components of the smart device 110. Rather, a property 116 may include any number of sensors in various locations, and the smart device 110 may receive data from these sensors during operation. Depending on the embodiment, the sensors may include one or more sensors connected to one or more pipes or exhaust pipes. Similarly, the sensors 120 may include one or more sensors disposed to determine a temperature of the building, weather surrounding a property 116, operation of a heating system, etc. In further embodiments, the computing device 117 associated with the property 116 may receive data from the sensors during operation. In still further embodiments, the computing device 117 associated with the property 116 may be the smart device 110.

The communications interface 118 may allow the smart device 110 to communicate with the mobile device 112, the sensors 120, and/or a computing device 117 associated with the property 116. The communications interface 118 may support wired or wireless communications, such as USB, Bluetooth, Wi-Fi Direct, Near Field Communication (NFC), etc. The communications interface 118 may allow the smart device 110 to communicate with various content providers, servers, etc., via a wireless communication network such as a fifth-, fourth-, or third-generation cellular network (5G, 4G, or 3G, respectively), a Wi-Fi network (802.11 standards), a WiMAX network, a wide area network (WAN), a local area network (LAN), etc. The processor may operate to format messages transmitted between the smart device 110 and the mobile device 112, sensors 120, and/or computing device 117 associated with the property 116; process data from the sensors 120; transmit communications to the request server 180; etc.

In some embodiments, the smart device 110 may collect the home telematics data using the sensors 120. In further embodiments, the smart device 110 may operate according to one or more parameters and/or determinations made by the mobile device 112 and/or computing device 117 associated with the property 116 using sensor data gathered by another smart device 110 and/or the sensors 120.

Depending on the embodiment, the smart device 110 may collect home telematics data regarding the usage and/or occupancy of the property. As such, in some embodiments, the home telematics data may include data such as security camera data, electrical system data, plumbing data, appliance data, energy data, maintenance data, guest data, and any other suitable data representative of property 116. For instance, the home telematics data may include data gathered from motion sensors and/or images of the home from which it may be determined how many people occupy the property and the amount of time they each spend within the home. Additionally or alternatively, the home telematics data may include electricity usage data, water usage data, HVAC usage data (e.g., how often the furnace or air conditioner unit is on), and smart appliance data (e.g., how often the stove, oven, dish washer, or clothes washer is operated). The home telematics data may also include home occupant mobile device data or home guest mobile device data, such as GPS or other location data.

The user data (e.g., user telematics data) may include data from the user's mobile device, or other computing devices, such as smart glasses, wearables, smart watches, laptops, smart glasses, augmented reality glasses, virtual reality headsets, etc. The user data or user telematics data may include data associated with the movement of the user, such as GPS or other location data, and/or other sensor data, including camera data or images acquired via the mobile or other computing device. In some embodiments, the user data and/or user telematics data may include historical data related to the user, such as historical home data, historical claim data, historical accident data, etc. In further embodiments, the user data and/or user telematics data may include present and/or future data, such as expected occupancy data, projected claim data, projected accident data, etc. Depending on the embodiment, the historical user data and the present and/or future data may be related.

The user data or user telematics data may also include home telematics data collected or otherwise generated by a home telematics app installed and/or running on the user's mobile device or other computing device. For instance, a home telematics app may be in communication with a smart home controller (e.g., for controlling a heating/HVAC system) and/or smart appliances or other smart devices situated about a home, and may collect data from the interconnected smart devices and/or smart home sensors. Depending on the embodiment, the user telematics data and/or the home telematics data may include information input by the user at a computing device or at another device associated with the user. In further embodiments, the user telematics data and/or the home telematics data may only be collected or otherwise generated after receiving a confirmation from the user, although the user may not directly input the data.

Mobile device 112 may be associated with (e.g., in the possession of, configured to provide secure access to, etc.) a particular user, who may be an owner of a property or a guest staying at the property, such as property 116. Mobile device 112 may be a personal computing device of that user, such as a mobile device, smartphone, a tablet, smart contacts, smart glasses, smart headset (e.g., augmented reality, virtual reality, or extended reality headset or glasses), smart watch, wearable, or any other suitable device or combination of devices (e.g., a smart watch plus a smartphone) with wireless communication capability. In the embodiment of FIG. 1, mobile device 112 may include a processor 150, a communications interface 152, sensors 154, a memory 170, and a display 160.

Processor 150 may include any suitable number of processors and/or processor types. Processor 150 may include one or more CPUs and one or more graphics processing units (GPUs), for example. Generally, processor 150 may be configured to execute software instructions stored in memory 170. Memory 170 may include one or more persistent memories (e.g., a hard drive and/or solid state memory) and may store one or more applications, including report application 172.

The mobile device 112 may be communicatively coupled to the smart device 110, the sensors 120, and/or a computing device 117 associated with the property 116. For example, the mobile device 112 and the smart device 110, sensors 120, and/or computing device 117 associated with the property 116 may communicate via USB, Bluetooth, Wi-Fi Direct, Near Field Communication (NFC), etc. For example, the smart device 110 may send home telematics data, user telematics data, or other sensor data in the property 116 via communications interface 118 and the mobile device 112 may receive the home telematics data or other sensor data via communications interface 152. In other embodiments, mobile device 112 may obtain the home telematics data from the property 116 from sensors 154 within the mobile device 112.

Further still, mobile device 112 may obtain the home telematics data and/or user telematics data via a user interaction with a display 160 of the mobile device 112. For example, a user may indicate via the display 160 that the user is not present in a building and/or confirm or give instructions via the display 160. The mobile device 112 may then generate a communication that may include the home telematics data and/or user telematics data, and may transmit the communication 192 to the request server 180 via communications interface 152.

In some embodiments, the command application 172 may include or may be communicatively coupled to a heating system malfunction and/or burst pipe detection application or website as well as one or more smart devices 110. In such embodiments, the request server 180 may obtain the home telematics data and/or user telematics data via stored data in the command application, via instructions 174 from the user, or via a notification 176 in the command application 172.

Depending on the embodiment, a computing device 117 associated with the property 116 may obtain home telematics data for the property 116 indicative of environmental conditions, housing and/or construction conditions, location conditions, or other similar metrics of home telematics data. The computing device 117 associated with the property 116 may obtain the home telematics data from one or more sensors 120 within the property 116. In other embodiments, the computing device 117 associated with the property 116 may obtain home telematics data through interfacing with a mobile device 112.

In some embodiments, the home telematics data may include interpretations of raw sensor data, such as detecting a homeowner is present when a sensor detects motion during a particular time period. The computing device 117 associated with the property 116, mobile device 112, and/or smart device 110 may collect and transmit home telematics data to the request server 180 via the network 130 in real-time or at least near real-time at each time interval in which the system 100 collects home telematics data. In other embodiments, a component of the system 100 may collect a set of home telematics data at several time intervals over a time period (e.g., a day), and the smart device 110, computing device 117 associated with the property 116, and/or mobile device 112 may generate and transmit a communication which may include the set of home telematics data collected over the time period.

Also, in some embodiments, the smart device 110, computing device 117 associated with the property 116, and/or mobile device 112 may generate and transmit communications periodically (e.g., every minute, every hour, every day), where each communication may include a different set of home telematics data and/or user telematics data collected over the most recent time period. In other embodiments, the smart device 110, computing device 117 associated with the property 116, and/or mobile device 112 may generate and transmit communications as the smart device 110, mobile device 112, and/or computing device 117 associated with the property 116 receive new home telematics data and/or user telematics data.

Next, the smart device 110 and/or computing device 117 associated with the property 116 may generate a communication 196 including a representation of the home telematics data wherein the communication 196 is stored at the request server 180 and/or an external database (not shown).

In some embodiments, generating the communication 196 may include (i) obtaining identity data for the smart device 110, computing device 117, and/or the property 116; (ii) obtaining identity data for the mobile device 112 in the property 116; and/or (iii) augmenting the communication 196 with the identity data for the smart device 110, the property 116, the computing device 117, and/or the mobile device 112. The communication 196 may include the home telematics data.

In some embodiments, the mobile device 112 or the smart device 110 may transmit the home telematics data to a request server 180. The request server 180 may include a processor 182 and a memory that stores various applications for execution by the processor 182. For example, a risk calculator 184 may obtain home telematics data for a property 116 and/or data related to the operation of a heating system (e.g., operation data) to analyze and calculate a risk (e.g., of malfunction, bursting, damage, etc.) during a particular time period in response to a calculation request 194.

In further embodiments, a requestor 114 may transmit a communication 194 including a risk calculation request to the request server 180 via the network 130. Depending on the embodiment, the requestor may include one or more processors 122, a communications interface 124, a request module 126, a notification module 128, and a display 129. In some embodiments, each of the one or more processors 122, communications interface 124, request module 126, notification module 128, and display 129 may be similar to the components described above with regard to the mobile device 112.

Depending on the embodiment, the requestor 114 may be associated with a particular user, such as a homeowner, a tenant, a homeshare participant, a home rental website and/or application, a real estate company, an underwriting company, an insurance company, etc. In some embodiments, the requestor 114 may be associated with the same user as the request server 180. In other embodiments, the requestor 114 is associated with a different user than the request server 180. In some such embodiments, the request module 126 and/or notification module 128 may include or be part of a request application, such as an underwriting application, an insurance application, etc.

In some embodiments, the requestor 114 may transmit a communication 194 including a calculation request to the requestor 180 via the communications interface 124. In some such embodiments, the requestor 114 may request the risk to use as an input to a rating model, an underwriting model, a claims generation model, or any other similarly suitable model. For example, the requestor 114 may request the risk of bursting and/or heating system malfunction to use to determine an overall potential risk for a property. As another example, the requestor 114 may request multiple risks (e.g., malfunction, bursting, etc.) to determine potential hazards with regard to building types.

In some embodiments, the calculated risk may be representative of a level of risk related to the property. The level of risk calculation may include a determination as to past or potential claim damage and/or severity of claim damage. In some embodiments, the level of risk may refer to a level of risk for a particular time period. Additionally or alternatively, the level of risk may include a determination of a quote or cost associated with the level of risk for the particular time period. In still further embodiments, the level of risk may include a determination of a quote or cost associated with the level of risk for a longer period of time, such as a month, year, etc.

In some embodiments, a mobile device 112 may stream the home telematics data and/or user telematics data to the request server 180 via the network 130 in real or near-real time. For example, the mobile device and/or a command application 172 on the mobile device 112 may update the request server 180 via the network 130 whenever a new event occurs with regard to home telematics data and/or user telematics data. In further embodiments, the mobile device 112 may receive confirmations of updated information and may notify the user that the mobile device 112 has updated the request server 180 via the network 130.

The mobile device 112 and the computing device 117 associated with the property 116 may be associated with the same user. Mobile device 112, and optionally the computing device 117 associated with the property 116, may be communicatively coupled to requestor 114 via a network 130. Network 130 may be a single communication network, or may include multiple communication networks of one or more types (e.g., one or more wired and/or wireless local area networks (LANs), and/or one or more wired and/or wireless wide area networks (WANs) such as the internet). In some embodiments, the requestor 114 may connect to the network 130 via a communications interface 124 much like mobile device 112.

While FIG. 1 shows only one mobile device 112, it is understood that many different mobile devices (of different users), each similar to mobile device 112, may be in remote communication with network 130. Additionally, while FIG. 1 shows only one property 116 and associated computing device 117, it is understood that many different entity locations, each similar to property 116, may include computing devices 117 that are in remote communication with network 130.

Further, while FIG. 1 shows only one requestor, 114, it is understood that many different requestors, each similar to requestor 114, may be in remote communication with network 130. Requestor 114 and/or any other similar requestor may be associated with an insurance company, a regulator organization, a property rental company, and/or a similar organization.

Exemplary Machine Learning

Optionally, the system 100 may determine particular data, whether a heating system is experiencing a malfunction, whether a pipe is at risk of bursting, and/or a level of risk of damage from the home telematics data and/or user telematics data using a machine learning model for data evaluation. The machine learning model may be trained based upon a plurality of sets of home telematics data and/or user telematics data, and corresponding determinations. The machine learning model may use the home telematics data and/or user telematics data to generate the determinations as described herein.

Machine learning techniques have been developed that allow parametric or nonparametric statistical analysis of large quantities of data. Such machine learning techniques may be used to automatically identify relevant variables (i.e., variables having statistical significance or a sufficient degree of explanatory power) from data sets. This may include identifying relevant variables or estimating the effect of such variables that indicate actual observations in the data set. This may also include identifying latent variables not directly observed in the data, viz. variables inferred from the observed data points.

Some embodiments described herein may include automated machine learning to determine risk levels, identify relevant risk factors, evaluate home telematics data and/or user telematics data, identify environmental risk factors, identify locale-based risk factors, identify heating system risk factors, identify plumbing risk factors, and/or perform other functionality as described elsewhere herein.

Although the methods described elsewhere herein may not directly mention machine learning techniques, such methods may be read to include such machine learning for any determination or processing of data that may be accomplished using such techniques. In some embodiments, such machine-learning techniques may be implemented automatically upon occurrence of certain events or upon certain conditions being met. Use of machine learning techniques, as described herein, may begin with training a machine learning program, or such techniques may begin with a previously trained machine learning program.

A processor or a processing element may be trained using supervised or unsupervised machine learning, which may be followed by or used in conjunction with reinforced or reinforcement learning, and the machine learning program may employ a neural network, which may be a convolutional neural network, a deep learning neural network, or a combined learning module or program that learns in two or more fields or areas of interest. Machine learning may involve identifying and recognizing patterns in existing data (such as weather data, operation data, customer financial transaction, location, browsing or online activity, mobile device, vehicle, and/or home sensor data) in order to facilitate making predictions for subsequent customer data. Models may be created based upon example inputs of data in order to make valid and reliable predictions for novel inputs.

Additionally or alternatively, the machine learning programs may be trained by inputting sample data sets or certain data into the programs, such as mobile device, server, or home system sensor and/or control signal data, and other data discussed herein. The machine learning programs may utilize deep learning algorithms that are primarily focused on pattern recognition, and may be trained after processing multiple examples. The machine learning programs may include Bayesian program learning (BPL), voice recognition and synthesis, image or object recognition, optical character recognition, and/or natural language processing, either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct or a preferred output. In unsupervised machine learning, the processing element may be required to find its own structure in unlabeled example inputs. In one embodiment, machine learning techniques may be used to extract the control signals generated by computer systems or sensors, and under what conditions those control signals were generated. These techniques may be followed by reinforced or reinforcement learning techniques.

The machine learning programs may be trained with smart device-mounted, home-mounted, and/or mobile device-mounted sensor data to identify certain home data, such as analyzing home telematics data and/or user telematics data to identify and/or determine environmental data, location data, first responder data, home structure data, occupancy data, usage data, a likelihood of pipe damage, and/or other such potentially relevant data. In some embodiments, the machine learning programs may be trained with irregularities such that the machine learning programs may be trained to match, compare, and/or otherwise identify property events, such as a heating system malfunction or a pipe bursting. Depending on the embodiment, the machine learning programs may be initially trained according to such using example training data and/or may be trained while in operation using incident data for a particular property.

After training, machine learning programs (or information generated by such machine learning programs) may be used to evaluate additional data. Such data may be related to publicly accessible data, such as building permits and/or chain of title. Other data may be related to privately-held data, such as insurance and/or claims information related to the property and/or items associated with the property. The trained machine learning programs (or programs utilizing models, parameters, or other data produced through the training process) may then be used for determining, assessing, analyzing, predicting, estimating, evaluating, or otherwise processing new data not included in the training data. Such trained machine learning programs may, therefore, be used to perform part or all of the analytical functions of the methods described elsewhere herein.

It will be understood that the above disclosure is one example and does not necessarily describe every possible embodiment. As such, it will be further understood that alternate embodiments may include fewer, alternate, and/or additional steps or elements.

Exemplary Systems for Detecting and Responding to Heating System Malfunctions

Figure 2A:
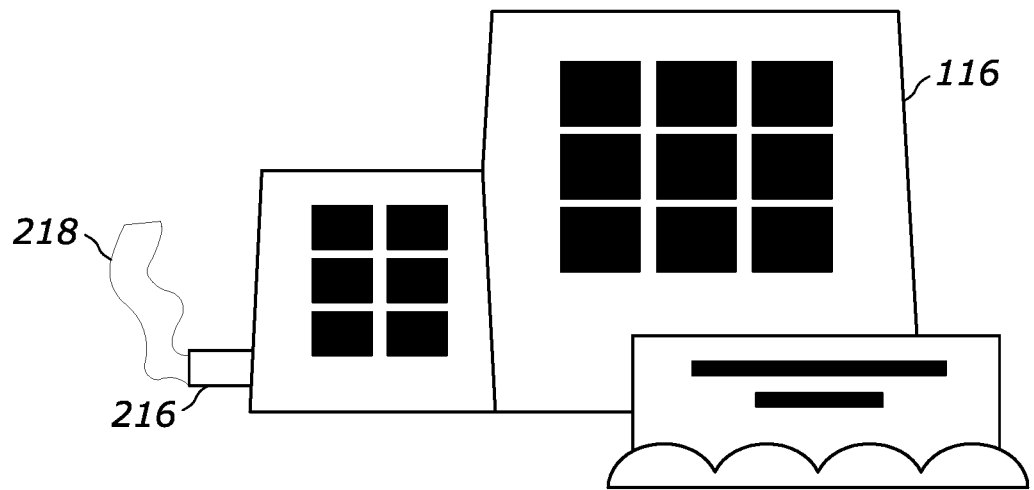
FIG. 2A depicts an exemplary scenario for normal operation of a heating system with an exposed exhaust pipe.
Figure 2B:
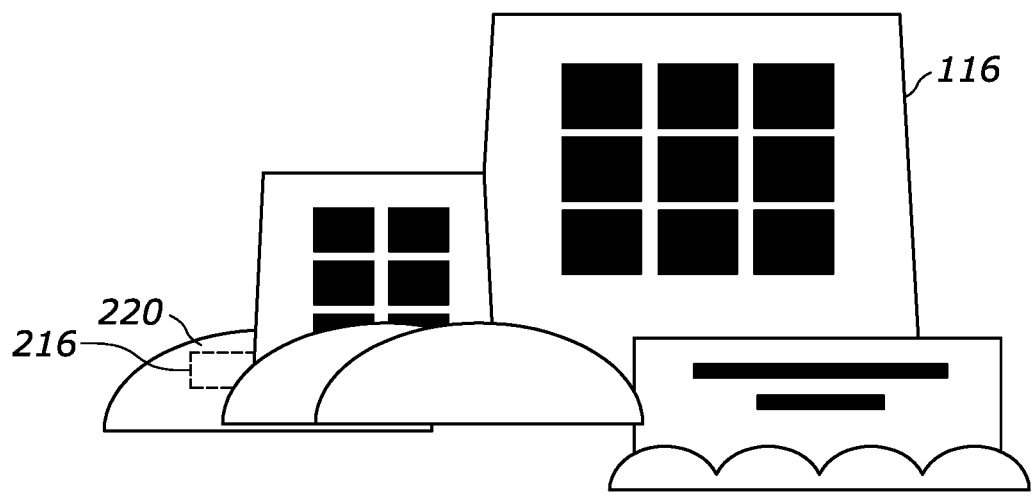
FIG. 2B depicts an exemplary scenario for an obstruction to an exhaust pipe causing a potential malfunction within a heating system.

FIG. 2A illustrates an exemplary scenario 200A in which a structure with a heating system including an exhaust pipe is functioning properly. FIG. 2B, by contrast, depicts an exemplary scenario 200B in which the exhaust pipe is blocked, causing a malfunction in the heating system for the structure.

In particular, scenario 200A depicts a structure 116 including an exhaust pipe 216. The exhaust pipe 216 is releasing exhaust 218 (e.g., heated air, carbon monoxide, etc.) produced by the heating system. Scenario 200B, however, depicts an obstruction 220 blocking the exhaust pipe 216 and preventing any emission of exhaust. As such, the heating system for the structure 116 may automatically turn off to prevent build up of carbon monoxide or damage to the system.

Depending on the embodiment, the heating system for the structure 116 may include one or more sensors that cause the heating system to automatically turn off. For example, the exhaust pipe 216 may include a pressure sensor in, on, or near the exhaust pipe that determines whether an obstacle is blocking the exhaust pipe. Depending on the embodiment, the obstacle may be snow, water (e.g., via flooding), an inanimate obstacle (e.g., a rock, plank, garbage can, etc.), an animal and/or next (e.g., a rat, woodchuck, bird nest, etc.), and/or any other such potential obstacle. Additionally or alternatively, the structure 116 may include a moisture sensor (e.g., for detecting weather-related blockage), a carbon monoxide detector, and/or any other sensor as described herein.

It will be understood that the above disclosure is one example and does not necessarily describe every possible embodiment. As such, it will be further understood that alternate embodiments may include fewer, alternate, and/or additional steps or elements.

Figure 3A:
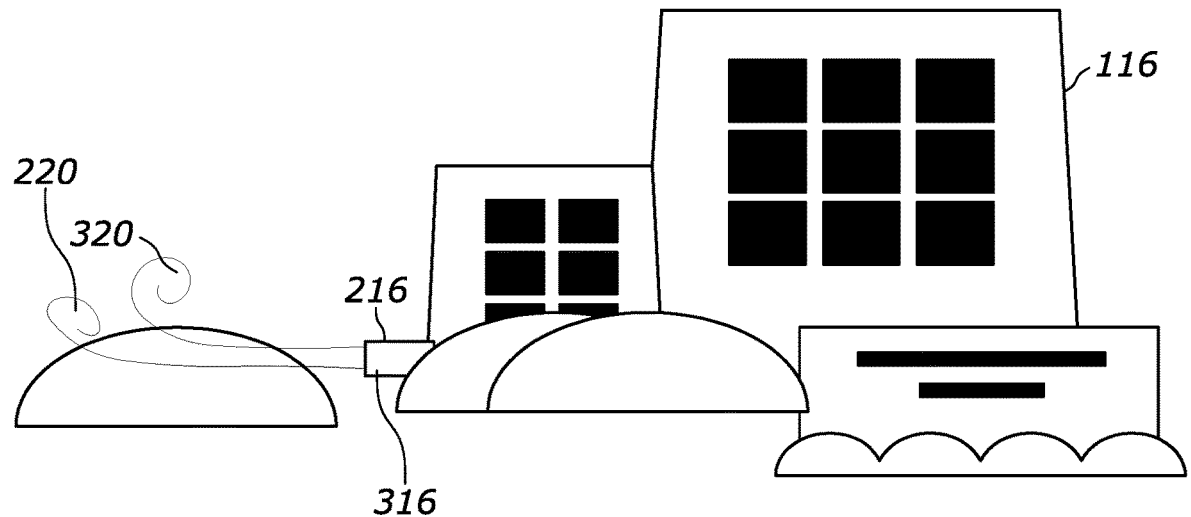
FIG. 3A depicts an exemplary side view of a scenario for using pressurized or heated air to remove an obstruction to an exhaust pipe for a heating system, for example as depicted in FIG. 2B.
Figure 3B:
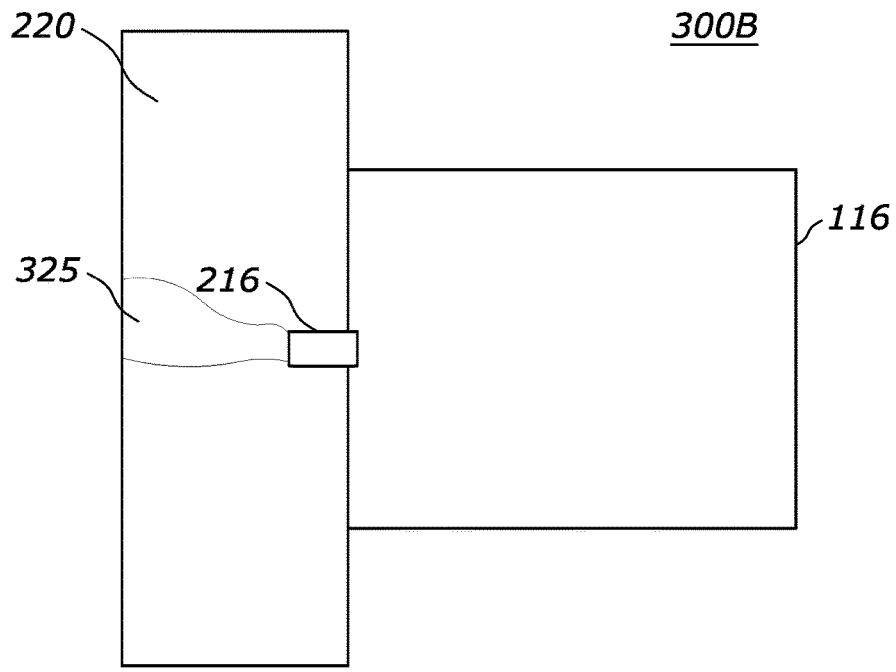
FIG. 3B depicts a top-down view of an exemplary scenario for using pressurized or heated air to remove an obstruction to an exhaust pipe for a heating system, similar to FIG. 3A.

FIG. 3A depicts a side view 300A of an exemplary computer system for clearing a blockage as depicted in FIG. 2B. Similarly, FIG. 3B shows a top-down view 300B of the same system for clearing a blockage as depicted in FIG. 2B. In particular, the exhaust pipe 216 includes an apparatus 316 causing pressurized air 320 to be expelled and push the obstruction 220 away. In some embodiments, the pressurized air 320 may additionally or alternatively be heated air, and may therefore melt the obstruction 220, clearing at least a path 325 for exhaust to exit the exhaust pipe 216.

Depending on the embodiment, the apparatus 316 may be attached to an exterior of the exhaust pipe 216, an interior wall of the exhaust pipe 216, adjacent to and/or near the exhaust pipe 216, around the exit of the exhaust pipe 216 (e.g., as a ring shape), etc. Further, in some embodiments, the apparatus 316 expels a single burst of pressurized air 320. In further embodiments, the apparatus 316 expels multiple bursts of pressurized air 320 until determining that the obstruction 220 is gone, a predetermined timer expires, a predetermined number of bursts of pressurized air 316 have been expelled, receiving an indication from the system 100 to stop, etc. In still further embodiments, the apparatus 316 may expel a stream of pressurized air 320 until any of the above conditions are met.

Figure 3C:
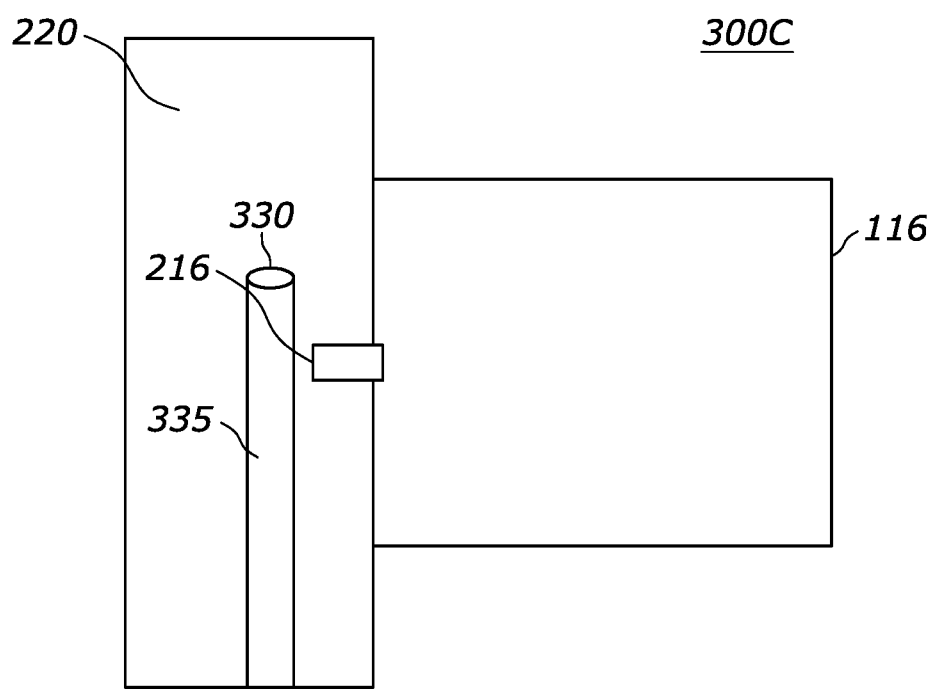
FIG. 3C depicts a top-down view of another exemplary scenario depicting using a smart device to remove an obstruction to an exhaust pipe, for example as depicted in FIG. 2B.

FIG. 3C depicts a top-down view 300C of a similar system to that depicted in FIGS. 3A and 3B. Instead of an apparatus 330, however, the exemplary embodiment of FIG. 3C uses a smart device 330 to clear a path 335 by moving adjacent (e.g., perpendicular) to an exit of the exhaust pipe 216, dislodging at least part of the obstruction 220. In some embodiments, the smart device 330 receives an activation command and automatically leaves a home station (not shown) and begins following a predetermined path to clear any and all exhaust pipes (e.g., exhaust pipe 216 and/or other exhaust pipes not shown). In further embodiments, the smart device 330 may receive an indication of a particular exhaust pipe location, and the smart device 330 may automatically generate and/or follow a generated path to the location. In still further embodiments, the smart device 330 may receive granular directions to guide the device 330 to the obstruction 220.

Depending on the embodiment, the smart device 330 may pass by the exhaust pipe 216 location once before returning to a base location. In further embodiments, the smart device 330 may pass by the exhaust pipe 216 multiple times and/or until receiving an indication that the obstruction 220 is cleared. If the smart device 330 is unable to clear the obstruction 220 within a predetermined period of time and/or within a predetermined number of passes, the smart device 330 may transmit a message indicating that the operation was unsuccessful and return back to the origin location.

In further embodiments, the smart device 330 may include additional functionalities, such as lights, audio systems, and/or an apparatus 316 for blowing pressurized and/or heated air. In some embodiments, the smart device 330 emits noise and/or light to alert people of its presence and/or to scare away animals potentially blocking the exhaust pipe 216. In further embodiments, the smart device 330 activates the apparatus 316 to blow pressurized air to clear the obstruction 220 as described above with regard to FIGS. 3A and 3B.

It will be understood that the above disclosure is one example and does not necessarily describe every possible embodiment. As such, it will be further understood that alternate embodiments may include fewer, alternate, and/or additional steps or elements.

Exemplary Malfunction Detection Applications and Interfaces

Figure 4:
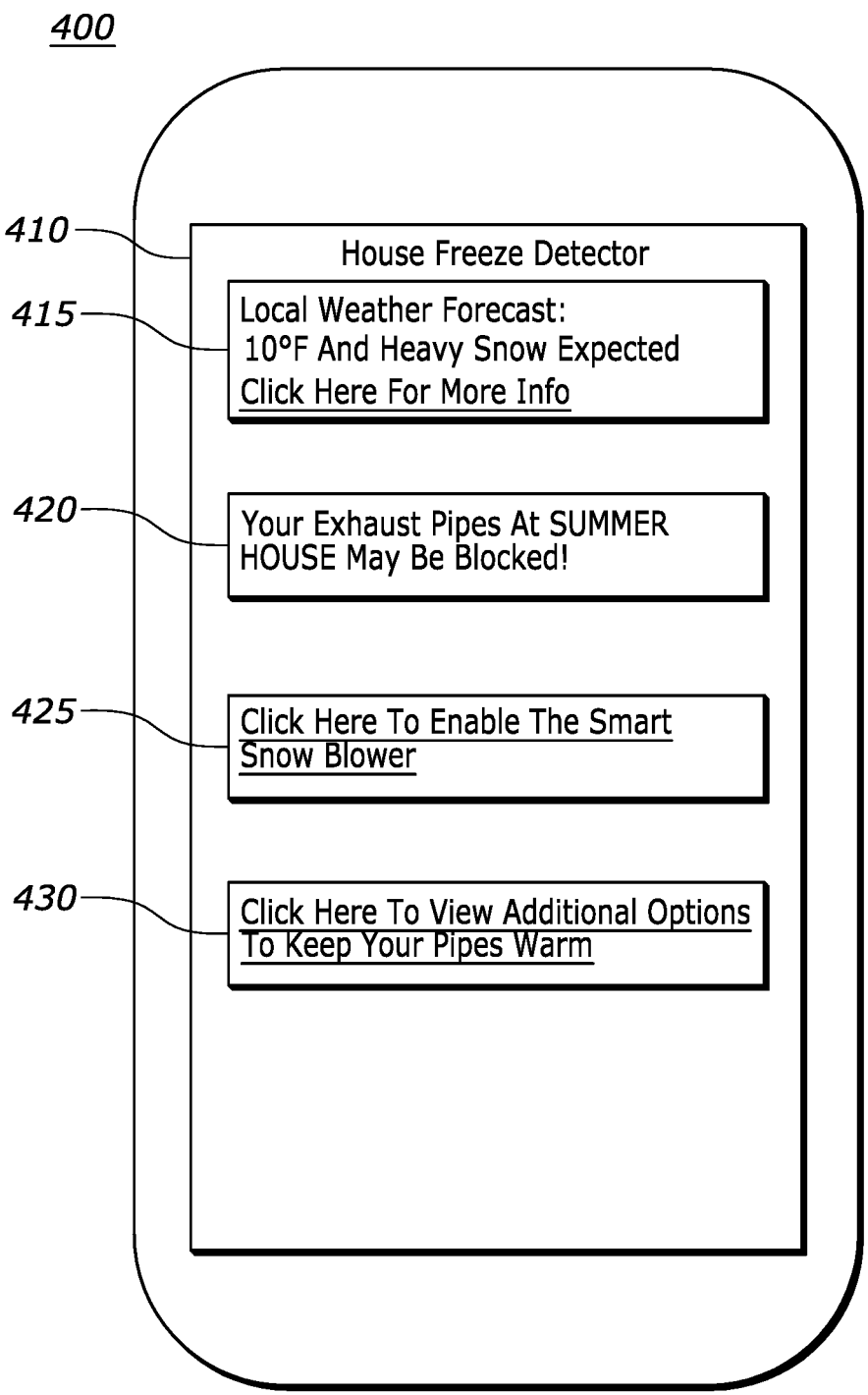
FIG. 4 depicts an exemplary interface for depicting a heating system malfunction and/or frozen pipe event, as well as potential options to take, to a user.

FIG. 4 illustrates an exemplary interface 400 that displays a page 410 of an application or a website providing information for detecting potential malfunctioning in a heater system of a property. In particular, the page 410 may include an indication of a weather forecast 415 and one or more options for courses of action that a user can take to address the malfunctioning heater system and/or predicted frozen pipes. Although FIG. 4 depicts two options, it will be understood that a page 410 may provide any suitable number of options, including a link to a page that includes more or all of the options.

In some embodiments, the weather forecast 415 may include a current temperature, current climate condition, expected conditions, etc. Depending on the embodiment, the weather forecast 415 may depict the weather forecast 1 hour ahead of time, 12 hours ahead of time, 1 day ahead of time, etc. In some embodiments, the weather forecast 415 may include a link, dropdown menu, etc. to display additional information regarding the weather data. In further embodiments, such a link may redirect the user to a third-party website from which the application draws weather data. Alternatively, the link may redirect the user to a page associated with the application or interface 400 maintained by an entity responsible for the application.

In some embodiments, the page 410 includes a location name 420 associated with the predicted and/or detected malfunction in the heating system. Depending on the embodiment, the location name 420 may be or include a name for the malfunction location as defined by a user associated with the interface 400 and/or the application. For example, in the exemplary embodiment of FIG. 4, the malfunction location 420 is named "SUMMER HOUSE" by the user. In some embodiments, the user may name the malfunction location 420 upon associating the relevant sensors with the application. In further embodiments, the malfunction location 420 may be a sensor number or other such name automatically assigned by the application (e.g., "SENSOR 3" or "LOCATION 4").

Depending on the embodiment, the page 410 may include one or more action commands (e.g., action command 425 and/or 430) a user may interact with to cause the application and/or a system associated with the application to take the appropriate action. In some embodiments, the page 410 may include an action command 425 to cause a system associated with the application to take action to rectify the detected or potential malfunction. For example, if the application is coupled to a smart device that causes increased air flow from exhaust pipes, the user may activate the smart device via the action command 425 in the interface 400. Similarly, if the application is coupled to a smart device (e.g., smart device 330 as described with regard to FIG. 3C above) that physically moves an obstruction blocking the exhaust pipes of a heating system (e.g., snow, a nest, an animal, etc.), then the user may activate and/or control the smart device via the action command 425 in the interface 400.

In further embodiments, the action command 425 may additionally or alternatively cause a call to be placed to a specialist to address the problem, include a link to a "do-it-yourself" (DIY) solution, shut off water to a location, cause one or more other smart devices to operate (e.g., opening cabinet doors, vents, etc.), submit a claim to an entity associated with the application, and/or any other similar action. Depending on the embodiment, a system and/or entity associated with the application may provide a user a discount to a premium, policy, etc. for enabling an action command 425.

By providing action commands 425 and/or 430 to a user, a system may provide technical advantages to a user. For example, such a system may allow for remote control of various components to reduce the damage caused by a malfunctioning heating system (and from subsequent damage, such as frozen or potentially frozen pipes). Similarly, such a system may allow for increased operation efficiency by identification of points that require action to prevent a heating system from malfunctioning while reducing waste by undertaking action only where necessary and by the necessary extent.

Depending on the embodiment, the interface 400 may include an action command 430 providing a link to additional and/or alternative action commands that a user may use to take other actions and/or to additional resources the user may use to come to an informed decision regarding the malfunction. Similarly, it will be understood that the interface may include additional action commands that allow a user more particular and/or wider control over various aspects of the system, such as inputting training data for a model, running simulations, viewing past and/or present information related to a particular sensor system, etc.

It will be understood that the above disclosure is one example and does not necessarily describe every possible embodiment. As such, it will be further understood that alternate embodiments may include fewer, alternate, and/or additional steps or elements.

Figure 5:
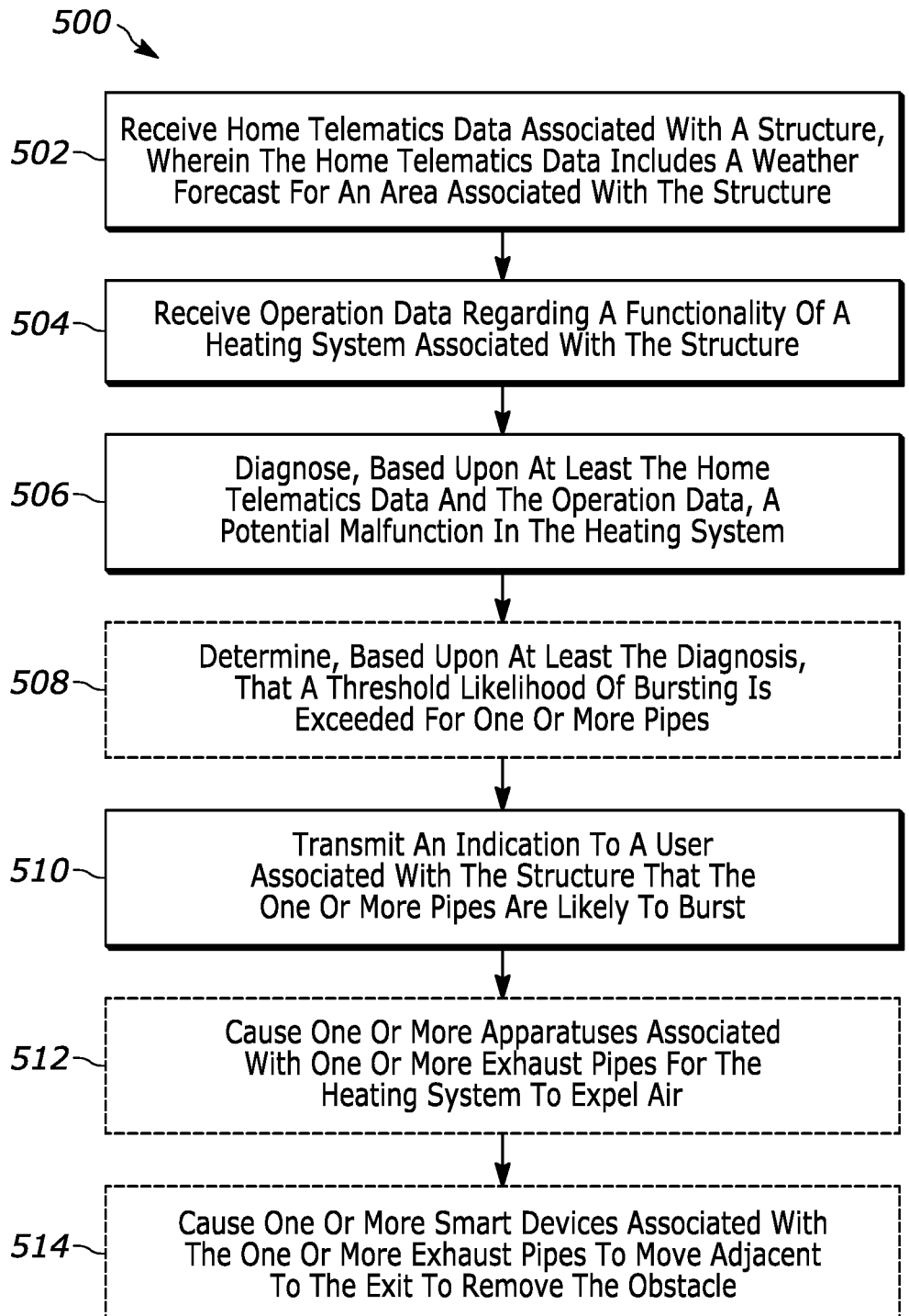
FIG. 5 depicts a flow diagram representing an exemplary computer-implemented method for detecting a potential heating system malfunction based upon home telematics data and/or operation data.

Exemplary Computer-Implemented Method for Detecting and Responding to Potential Malfunctions FIG. 5 is a flow diagram of an exemplary computer-implemented method 500 for detecting and responding to a likelihood of a heating system malfunction. The method 500 may be implemented by one or more processors of a computing system such as a computing device representing property 116 or mobile device 112. Alternatively or additionally, the method 500 may be implemented by one or more processors of a distributed system such as system 100 and/or various components of system 100 as described with regard to FIG. 1 above, or otherwise implemented by one or more local or remote processors, servers, sensors, transceivers, memory units, wearables, smart contacts, smart glasses, virtual reality headsets, augmented reality glasses or headsets, mixed or extended reality headsets or glasses, voice or chat bots, ChatGPT bots, and/or other electronic or electrical components, including those mentioned elsewhere herein.

At block 502, the computer system 100 may receive home telematics data associated with a structure. In some embodiments, the home telematics data includes a weather forecast for an area associated with the structure. Depending on the embodiment, the weather forecast may be a local weather forecast and/or national weather forecast (e.g., from a weather service), a local temperature, a local moisture/humidity detection, a local snowfall detection, etc. In further embodiments, the system 100 may include one or more sensors, such as water flow sensors, and/or smart devices and determines a weather forecast based upon the received information. In some embodiments, the system 100 determines whether a storm is approaching based upon the home telematics data.

In some embodiments, the home telematics data may be indicative of moisture and/or water flow in or around the property. In further embodiments, the home telematics data may be additionally indicative of an occupancy and/or usage of the property. For example, the home telematics data may include motion sensor data, electricity usage data, smart device data, water flow data, water usage data, electricity meter or water meter data, smart appliance data, mobile device data, smart vehicle data, user device data, etc. In such embodiments, the system 100 may determine whether an individual is occupying the building based upon the home telematics data. Depending on the embodiment, the system 100 may make the determination using a trained machine learning model as discussed herein.

At block 504, the computer system 100 may receive operation data regarding a functionality of a heating system associated with the structure. In some embodiments, the operation data may be generated by one or more sensors associated with the heating system for the structure. Depending on the embodiment, the one or more sensors may include any or all of an air flow sensor, an internal thermometer, an external thermometer, a sensor communicatively coupled to a thermostat, a moisture sensor, an accelerometer, a pressure sensor, and/or any other such sensor configured to provide data as described herein.

In certain embodiments in which the one or more sensors includes air flow sensor(s), the air flow sensor(s) may be positioned at an exhaust port associated with the heating system for the structure. The air flow sensor(s) may monitor the air flow at an exhaust port and determine when air flow is normal, air flow is above average, air flow is below average, air flow has stopped, etc. Depending on the embodiment, the air flow sensor(s) may consistently report air flow to a server and/or a computing device associated with the structure. In further embodiments, the air flow sensor(s) may report abnormalities in sensing data (e.g., indications that exceed a predetermined margin of error around an average value). In still further embodiments, the air flow sensor(s) may report abnormalities based upon time of day (e.g., an abnormality at midnight may be normal operation at noon). Similarly, one or more moisture sensors may be placed in or near the exhaust pipes to determine when moisture (e.g., snow, ice, flooding, etc.) is present in or around the exhaust pipe and may be preventing the heating system from functioning properly.

In embodiments in which the one or more sensors include temperature sensor(s), the temperature sensor(s) may be connected to a thermostat associated with the structure. In such embodiments, the temperature sensor(s) may detect when a thermostat does not activate and transmit such to a computing device that determines whether the thermostat should be activating. In further embodiments, the temperature sensor(s) may determine a temperature inside or outside the structure and determine that the heating system should be turning on.

In embodiments in which the one or more sensors include accelerometer(s), the accelerometer(s) may be placed along the outside of one or more pipes associated with the heating system (e.g., an exhaust pipe). In such embodiments, the accelerometer(s) may determine whether the heating system is functioning based at least upon the pattern of vibrations for the pipes. In some such embodiments, the accelerometer(s) and/or a computing device associated with the accelerometer(s) making such determinations may use a machine learning model trained to determine the pattern of vibrations. In further embodiments, the machine learning model is trained such that the exhaust and/or pipe vibration signature is detectable, as is a malfunctioning model. In further embodiments, any deviation from the model (above a certain error range) for a predetermined period of time may be considered a malfunction (e.g., blocked/clogged pipes) and transmit to a computing device within the system 100.

In some embodiments, the system 100 may train the machine learning algorithm by using the home telematics data received at block 502, the received operation data, and/or determinations made based upon such (e.g., with regard to blocks 508 and/or 510 as described below). For example, the system 100 may use the gathered home telematics data and/or operation data as representative of regular activity for an area associated with the algorithm/model.

Depending on the embodiment, the system 100 may update the machine learning algorithm every time the system detects a malfunction in the heating system associated with the algorithm/model. In further embodiments, the system 100 may train the machine learning algorithm for a predetermined period of time before using the algorithm for monitoring. For example, the system 100 may train the machine learning algorithm for 1 week, 1 month, 6 months, etc. and may subsequently use the machine learning algorithm to monitor for irregular activity. In further embodiments, the system 100 may additionally or alternatively prompt the user to confirm whether to use data for training.

As such, the user may confirm whether irregular activity should be used to train the algorithm (e.g., where the irregular activity is indicative of a malfunction). Depending on the embodiment, the system 100 may provide the confirmation prompt after each instance of detected activity, for detected activity occurring with a predetermined period of time of each other, each day when the potential malfunction is detected, etc. In some embodiments, the system may 100 provide the prompt only after the initial training period as described above.

At block 506, the system 100 may diagnose a potential malfunction in the heating system, based upon at least the home telematics data and/or the operation data. In some embodiments, the system 100 determines a particular location for the malfunction. For example, the system 100 may determine that a potential malfunction is occurring at the exhaust pipe due to the operation data indicating a malfunction occurring and the home telematics data indicating enough snowfall to block the exhaust pipe for the heating system. In further embodiments, the system 100 determines one or more locations where the malfunction is not occurring, and, upon determining that the system 100 cannot determine where the malfunction is, alerts the user and/or a service specialist to check the heating system manually.

Depending on the embodiment, the diagnosis may include a cause and/or solution. For example, if the system 100 diagnoses a malfunction as occurring at the exhaust pipe and that snow is blocking the exhaust pipe. The system 100 may recommend a solution of enabling an air expulsion apparatus (e.g., as described below with regard to block 512) and/or a smart device snow blower (e.g., as described below with regard to block 514). In some embodiments, the system 100 automatically performs the solution. In further embodiments, the system 100 prompts a user and/or homeowner for confirmation before undertaking the solution.

In some embodiments, the system 100 may diagnose a potential malfunction after occurring (e.g., the system 100 detects the malfunction location and/or nature). In further embodiments, the system 100 may diagnose the potential malfunction by preemptively predicting a location and/or nature for the malfunction.

For example, the system 100 may determine, based upon historical operation data and home telematics data including weather data that an exhaust pipe associated with the heating system for a structure will be blocked by snowfall and cause the heating system to malfunction. In such embodiments, the system 100 may cause various components to activate and/or take action (e.g., as described below with regards to blocks 510, 512, and/or 514) preemptively rather than after the malfunction occurs.

At block 508, the system 100 may determine, based upon at least the diagnosis, that a threshold likelihood of bursting is exceeded for one or more pipes. In particular, the system 100 may determine that the potential malfunction in the heating system may cause (or has already caused) the heating system to shut down. As such, the system 100 may determine that various pipes in a structure will cool down, freeze, and potentially burst. In some embodiments, the determination is additionally based upon the home telematics data (e.g., temperature and/or weather data) and/or the operation data (e.g., the heating system has turned off).

At block 510, the system 100 may transmit an indication to a user associated with the structure that the one or more pipes are likely to burst. Depending on the embodiment, the system includes an application coupled to the one or more sensors. In some such embodiments, the application sends an alert to a user via the application when the sensor detects that a pipe is likely to burst. Depending on the embodiment, the indication to the user includes at least one of: (i) an alert through a mobile application; (ii) a text message; or (iii) an audio alert through a user device. In further embodiments, the system 100 may additionally or alternatively transmit an indication by and/or in addition to causing an apparatus to expel air and/or a smart device to begin operation as described in more detail with regard to blocks 512 and 514 below.

Depending on the embodiment, the system 100 may determine what indication to provide to the user based upon the occupancy of the property, as described herein. For example, the system 100 may determine to transmit the alert to the user if the property is determined to be occupied, and may additionally or alternatively cause the flow to proceed to either or both of blocks 512 and/or 514 if the property is unoccupied.

In some embodiments, the system 100 may transmit an indication to a user that pipes may burst due to the determination that the heating system is malfunctioning automatically upon diagnosing the potential malfunction (e.g., block 508 is skipped). In further embodiments, the system 100 may determine to transmit the indication only in response to the determination that pipes may burst (e.g., if the heating system malfunctions when the temperature is above freezing, the system may determine that the pipes are in no danger of bursting and refrains from transmitting the indication). In still further embodiments, the system 100 may transmit an indication focusing on the heating system (e.g., "Your heating system is malfunctioning! This may cause damage to your pipes in the event of a cold snap!").

At block 512, the system 100 may cause an apparatus associated with one or more exhaust pipes for the heating system to expel air. In some embodiments, the apparatus may be the exhaust pipes and/or another part of the heating system. In further embodiments, the apparatus may be an additional apparatus external to the heating system and attached to or otherwise associated with the exhaust pipe (e.g., attached to an external side of the exhaust pipe, attached to an internal side of the exhaust pipe, placed adjacent to or near the exhaust pipe, etc.). The apparatus may expel or may cause the exhaust pipe to expel pressurized and/or heated air to clear the blockage. Depending on the embodiment, the apparatus may expel a single pressurized and/or heated burst of air, multiple pressurized and/or heated bursts of air, a steady stream of pressurized and/or heated air, etc.

At block 514, the system 100 may cause one or more smart devices associated with the one or more exhaust pipes to move adjacent to the exit to remove the obstacle. In some embodiments, the system 100 transmits an activation command to the smart device, which automatically leaves a station and begins following a predetermined path to clear any and all exhaust pipes. In further embodiments, the system 100 may transmit an indication of a particular exhaust pipe location, and the smart device may automatically generate and/or follow a generated path to the location. In still further embodiments, the system 100 may transmit granular directions to guide the device to the obstacle.

Depending on the embodiment, the smart device may pass by the exhaust pipe location once before returning to a base location. In further embodiments, the smart device may pass by the exhaust pipe multiple times and/or until receiving an indication that the obstacle is clear. If the smart device is unable to clear the object within a predetermined period of time and/or within a predetermined number of passes, the device may transmit a message to the system 100 indicating that the operation was unsuccessful and return back to the origin location.

In various embodiments, the system 100 may perform each of blocks 512 and 514, only one of blocks 512 or 514, or neither of blocks 512 or 514. In some such embodiments, the system 100 decides which of blocks 512 and 514 to perform based upon an indication or prompt from a user associated with a mobile device (e.g., by selecting a solution option as described with regard to action command 425 in FIG. 4 above).

It will be understood that the above disclosure is one example and does not necessarily describe every possible embodiment. As such, it will be further understood that alternate embodiments may include fewer, alternate, and/or additional steps or elements.

With the foregoing, a user may opt-in to a rewards, insurance discount, or other type of program. After the user provides their affirmative consent, an insurance provider remote server may collect data from the user's mobile device, smart home device, smart vehicle, wearables, smart glasses, smart contacts, smart watch, augmented reality glasses, virtual reality headset, mixed or extended reality headset or glasses, voice or chat bots, ChatGPT bots, and/or other smart devices—such as with the customer's permission or affirmative consent. The data collected may be related to smart home functionality, accident data, and/or insured assets before (and/or after) an insurance-related event, including those events discussed elsewhere herein. In return, risk averse insureds, home owners, or home or apartment occupants may receive discounts or insurance cost savings related to home, renters, auto, personal articles, and other types of insurance from the insurance provider.

In one aspect, smart or interconnected home data, user data, and/or other data, including the types of data discussed elsewhere herein, may be collected or received by an insurance provider remote server, such as via direct or indirect wireless communication or data transmission from a smart home device, mobile device, smart vehicle, wearable, smart glasses, smart contacts, smart watch, augmented reality glasses, virtual reality headset, mixed or extended reality glasses or headset, voice bot, chat bot, ChatGPT bot, and/or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, vehicles, or renter belongings, and/or (ii) home or apartment renters and/or occupants.

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing." "computing," "calculating." "determining." "presenting." "displaying." or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising." "includes," "including." "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

In addition, use of "a" or "an" is employed to describe elements and components of the embodiments herein. This is done merely for convenience and to give a general sense of the invention. This description should be read to include one or at least one and the singular also may include the plural unless it is obvious that it is meant otherwise.

Upon reading this disclosure, those of skill in the art will appreciate still additional alternative structural and functional designs for providing feedback to owners of properties, through the principles disclosed herein. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality and improve the functioning of conventional computers.

What is claimed:

1. A computer-implemented method for detecting and responding to a likelihood of a heating system malfunction, the method comprising:
   receiving, by one or more processors, home telematics data associated with a structure, wherein the home telematics data includes local weather data for an area associated with the structure;
   receiving, by the one or more processors, operation data regarding a functionality of the heating system associated with the structure;
   diagnosing, by the one or more processors and based upon at least the home telematics data and the operation data, a potential malfunction in the heating system;
   determining, by the one or more processors and based upon at least the diagnosis, that a threshold likelihood of bursting is exceeded for one or more pipes;
   transmitting, by the one or more processors, an indication to a user associated with the structure that the one or more pipes are likely to burst; and
   causing, by the one or more processors, one or more smart devices associated with the one or more exhaust pipes to move adjacent to exits of the one or more exhaust pipes to remove an obstacle.

2. The computer-implemented method of claim 1, wherein diagnosing the potential malfunction includes:
   determining that the obstacle is blocking one or more exhaust pipes for the heating system; and
   determining that the heating system has or will shut down due to the obstacle blocking the one or more exhaust pipes.

3. The computer-implemented method of claim 2, further comprising:
   responsive to determining that the heating system has or will shut down, causing, by the one or more processors, one or more apparatuses associated with the one or more exhaust pipes to expel air to remove the obstacle.

4. The computer-implemented method of claim 2, wherein:
   causing the one or more smart devices to move is responsive to determining that the heating system has or will shut down.

5. The computer-implemented method of claim 1, wherein diagnosing the potential malfunction includes:
   determining, based upon at least the home telematics data, that a future weather event will cause a future blockage for one or more exhaust pipes for the heating system; and
   determining that a threshold likelihood of the heating system shutting down due to the blockage is exceeded.

6. The computer-implemented method of claim 5, further comprising:
   training, by the one or more processors and using historical telematics data, a machine learning model to determine whether a weather event will cause a blockage for the one or more exhaust pipes; and
   wherein diagnosing the potential malfunction is performed using the machine learning model.

7. The computer-implemented method of claim 5, further comprising:
   responsive to determining that threshold likelihood of the heating system shutting down due to the blockage is exceeded, preemptively causing, by the one or more processors, one or more apparatuses associated with the one or more exhaust pipes to expel air to prevent blockage.

8. The computer-implemented method of claim 1, further comprising:
   causing, by the one or more processors, a water flow through the one or more pipes to stop responsive to determining that the threshold likelihood of bursting is exceeded for the one or more pipes.

9. The computer-implemented method of claim 1, wherein the operation data includes at least one of: (i) air flow sensor data; (ii) internal temperature data; (iii) moisture data; or (iv) accelerometer data.

10. The computer-implemented method of claim 1, wherein diagnosing the potential malfunction includes:
    determining, based upon at least the operation data and using a machine learning model, that one or more components of the heating system are not activated; and
    determining, based upon at least determining that the one or more components of the heating system are not activated, that the heating system is malfunctioning.

11. A computing device for detecting and responding to a likelihood of a heating system malfunction, the computing device comprising:
    one or more processors;
    a communication unit;
    one or more sensors associated with a heating system associated with a structure; and
    a non-transitory computer-readable medium coupled to the one or more processors and the communication unit and storing instructions thereon that, when executed by the one or more processors, cause the computing device to:
      receive home telematics data associated with the structure, wherein the home telematics data includes local weather data for an area associated with the structure;
      receive, from the one or more sensors, operation data regarding a functionality of the heating system;
      diagnose, based upon at least the home telematics data and the operation data, a potential malfunction in the heating system;
      determine, based upon at least the diagnosis, that a threshold likelihood of bursting is exceeded for one or more pipes;
      transmit an indication to a user associated with the structure that the one or more pipes are likely to burst; and
      cause one or more smart devices associated with the one or more exhaust pipes to move adjacent to exits of the one or more exhaust pipes to remove an obstacle.

12. The computing device of claim 11, wherein the instructions that cause the computing device to diagnose the potential malfunction cause the computing device to:
    determine that the obstacle is blocking one or more exhaust pipes for the heating system; and
    determine that the heating system has or will shut down due to the obstacle blocking the one or more exhaust pipes.

13. The computing device of claim 12, wherein the non-transitory computer-readable medium further stores instructions that, when executed by the one or more processors, cause the computing device to:
    cause, responsive to determining that the heating system has or will shut down, one or more apparatuses associated with the one or more exhaust pipes to expel air to remove the obstacle.

14. The computing device of claim 12, wherein:
causing the one or more smart devices to move is responsive to determining that the heating system has or will shut down.

15. The computing device of claim 11, wherein the instructions that cause the computing device to diagnose the potential malfunction cause the computing device to:
determine, based upon at least the home telematics data, that a future weather event will cause a future blockage for one or more exhaust pipes for the heating system; and
determine that a threshold likelihood of the heating system shutting down due to the blockage is exceeded.

16. The computing device of claim 15, wherein the non-transitory computer-readable medium further stores instructions that, when executed by the one or more processors, cause the computing device to:
preemptively cause, responsive to determining that threshold likelihood of the heating system shutting down due to the blockage is exceeded, one or more apparatuses associated with the one or more exhaust pipes to expel air to prevent blockage.

17. The computing device of claim 11, wherein the non-transitory computer-readable medium further stores instructions that, when executed by the one or more processors, cause the computing device to:
cause a water flow through the one or more pipes to stop responsive to determining that the threshold likelihood of bursting is exceeded for the one or more pipes.

18. The computing device of claim 11, wherein the diagnosing includes:
determining, based upon at least the operation data and using a machine learning model, that one or more components of the heating system are not activated; and
determining, based upon at least determining that the one or more components of the heating system are not activated, that the heating system is malfunctioning.

19. A tangible, non-transitory computer-readable medium storing instructions for detecting and responding to a likelihood of a heating system malfunction that, when executed by one or more processors of a computing device, cause the computing device to:
receive home telematics data associated with a structure, wherein the home telematics data includes local weather data for an area associated with the structure;
receive operation data regarding a functionality of the heating system associated with the structure;
diagnose, based upon at least the home telematics data and the operation data, a potential malfunction in the heating system;
determine, based upon at least the diagnosis, that a threshold likelihood of bursting is exceeded for one or more pipes;
transmit an indication to a user associated with the structure that the one or more pipes are likely to burst; and
cause one or more smart devices associated with the one or more exhaust pipes to move adjacent to exits of the one or more exhaust pipes to remove an obstacle.

20. The tangible, non-transitory computer-readable medium of claim 19, wherein the instructions that cause the computing device to diagnose the potential malfunction cause the computing device to:
determine that the obstacle is blocking one or more exhaust pipes for the heating system; and
determine that the heating system has or will shut down due to the obstacle blocking the one or more exhaust pipes.

* * * * *